United States Patent
Romig

(10) Patent No.: US 7,418,328 B2
(45) Date of Patent: Aug. 26, 2008

(54) STEERING LOGIC FOR SELF-PROPELLED MOWER

(75) Inventor: Bernard Edwin Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 11/429,873

(22) Filed: May 8, 2006

(65) Prior Publication Data

US 2007/0260370 A1    Nov. 8, 2007

(51) Int. Cl.
B62D 9/04 (2006.01)
B62D 5/04 (2006.01)
A01B 69/00 (2006.01)

(52) U.S. Cl. .................. 701/41; 701/69; 56/14.7; 180/253; 180/411; 180/413

(58) Field of Classification Search .................. 701/41
See application file for complete search history.

(56) References Cited

U.S. PATENT DOCUMENTS

| | | | | |
|---|---|---|---|---|
| 3,174,769 A * | 3/1965 | De Voghel | ............... | 180/409 |
| 3,235,283 A * | 2/1966 | De Voghel | ............... | 180/409 |
| 4,289,214 A | 9/1981 | Spence | ............... | 180/234 |
| 4,700,960 A * | 10/1987 | Miki et al. | ............... | 180/414 |
| 4,720,790 A * | 1/1988 | Miki et al. | ............... | 701/41 |
| 5,335,933 A * | 8/1994 | Yamamoto et al. | .... | 280/124.138 |
| 5,450,320 A | 9/1995 | Tsubaki et al. | ......... | 364/424.02 |
| 5,623,818 A | 4/1997 | Ledbetter | ............... | 56/15.4 |
| 5,667,032 A | 9/1997 | Kamlukin | ............... | 180/256 |
| 5,916,285 A | 6/1999 | Alofs et al. | ............... | 701/23 |
| 6,003,887 A * | 12/1999 | Howard | ............... | 280/89.11 |
| 6,109,379 A * | 8/2000 | Madwed | ............... | 180/65.5 |
| 6,491,127 B1 * | 12/2002 | Holmberg et al. | ............ | 180/252 |
| 6,540,039 B1 * | 4/2003 | Yu et al. | ............... | 180/253 |
| 6,597,975 B1 * | 7/2003 | Shinmura et al. | ............ | 701/48 |
| 6,604,348 B2 * | 8/2003 | Hunt | ............... | 56/10.6 |
| 6,786,296 B2 * | 9/2004 | Guldner et al. | ............ | 180/402 |
| 6,827,176 B2 * | 12/2004 | Bean et al. | ............... | 180/411 |
| 7,024,842 B2 | 4/2006 | Hunt et al. | ............... | 56/6 |
| 7,024,843 B2 | 4/2006 | Hunt et al. | ............... | 56/6 |
| 7,273,127 B2 * | 9/2007 | Pick et al. | ............... | 180/446 |
| 2004/0129491 A1* | 7/2004 | Bean et al. | ............... | 180/411 |
| 2006/0106516 A1* | 5/2006 | Pick et al. | ............... | 701/41 |

* cited by examiner

*Primary Examiner*—Thomas G. Black
*Assistant Examiner*—Shelley Chen

(57) ABSTRACT

Steering logic for a self-propelled vehicle having a plurality of wheels includes the steps of receiving translational velocity and angular velocity commands, determining the resultant velocity and steer angle of each wheel, and determining the wheel offset correction for each wheel based on the scrub radius of each wheel and the angular velocity command.

7 Claims, 7 Drawing Sheets

US 7,418,328 B2

STEERING LOGIC FOR SELF-PROPELLED MOWER

TECHNICAL FIELD OF THE INVENTION

The invention relates to self-propelled vehicles, and particularly to steering mechanisms for self-propelled mowers.

BACKGROUND OF THE INVENTION

Examples of self-propelled mowers are shown in U.S. Pat. Nos. 7,024,842 and 7,024,843 assigned to Deere & Company of Moline, Ill. The self-propelled mower frame supports wheel assemblies, a propulsion unit, and one or more mowing decks. Each wheel assembly may be associated with a corresponding wheel, electrical steering motor, and electrical drive motor. A controller controls a steering direction of orientation of the corresponding wheel via application of electrical energy to the corresponding drive motor consistent with maneuverable movement of the mower. The propulsion unit is capable of rotating at least one cutting blade housed under a mower deck. Self-propelled mowers may be riderless, or may provide an operator station on the vehicle platform.

Each wheel assembly may include a spindle assembly that is affixed to the frame or operably attached to the frame via a suspension component. The spindle assembly may provide a housing for bearings that receive a shaft. One end of the shaft may be associated with a yoke and the opposite end of the shaft may be associated with a steering assembly. The yoke may provide a mounting for a drive motor, a tire, and a drive encoder. The steering assembly may include a steering motor, a steering encoder, and a steering gearbox. The steering gearbox may provide gear reduction such that a lower torque motor (e.g., a lightweight durable motor) may be used as the steering motor. The steering motor may allow the shaft and yoke to pivot freely from zero to 360 degrees when no power or a certain control signal is applied to the steering motor. In an alternate embodiment, the steering gearbox may permit the steering motor to be disengaged from turning or changing the orientation of the wheel by a clutch, a gear mechanism or another mechanical or electromechanical structure.

When drive motors of wheels on a self-propelled vehicle such as a mower are at rest, operating the steering motors to steer the mower wheels in place may scuff the ground surface. Scuffing is a problem in areas where high quality mowing is important, including athletic fields. It is desirable to reduce or eliminate scuffing when steering while the mower wheels are not rotated by the drive motor.

Steering a self-propelled vehicle with the mower wheels in place also may require high steering torque. This requires higher torque motors and other components, and may be detrimental to the durability and performance of a self-propelled vehicle. It is desirable to reduce the required torque for steering a self-propelled vehicle when the drive motor for the wheel or wheels is at rest.

Steering a self-propelled vehicle with the mower wheels in place also may have a tendency to move the mower. It is desirable to keep the mower in a stationary position when steering the mower with the wheels in place.

In general, wheel assemblies on self-propelled vehicles such as mowers should be able to rotate continuously about a steer axis. This requires transmitting the power to drive the wheel across the steering joint for example, electric power for a propulsion motor must be transmitted from the vehicle frame down a tube or shaft and across the steering joint to a motor positioned on or adjacent the wheel hub. To transmit drive or traction power across the steering joint, slip rings, such as mercury wetted slip rings, may be required. For example, U.S. Pat. No. 5,450,320 relates to slip rings used to transmit power for the drive system in an automated guided vehicle. Slip rings may be expensive and may raise environmental concerns. It is desirable to eliminate the use of slip rings for steering self-propelled vehicles, and use less costly and more environmentally friendly alternative.

SUMMARY OF THE INVENTION

Steering logic for a self-propelled mower provides a wheel offset correction for each wheel's scrub radius. The steering logic makes it possible to operate a self-propelled mower equipped with three or more offset wheels in a manner that prevents scuffing and damage to the surface on which the vehicle is operating, while allowing full control of the vehicle platform's motion the coordination of skid steering and Ackerman steering maximizes tractive performance, allowing operation of the self-propelled vehicle on steeper slopes or providing more drawbar pull on level surfaces. The steering logic includes the steps of inputting commands for a desired translation velocity and a desired angular velocity of the center of the vehicle, calculating a rotational velocity as the vector cross product of the desired angular velocity and the steer axis for each wheel, adding the rotational velocity and the translational velocity to obtain a resultant velocity of the steer axis for the wheel, calculating the wheel offset correction as the product of the scrub radius and the desired angular velocity of the vehicle, and calculating and providing the actual speed and actual steer angle set points to each wheel.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
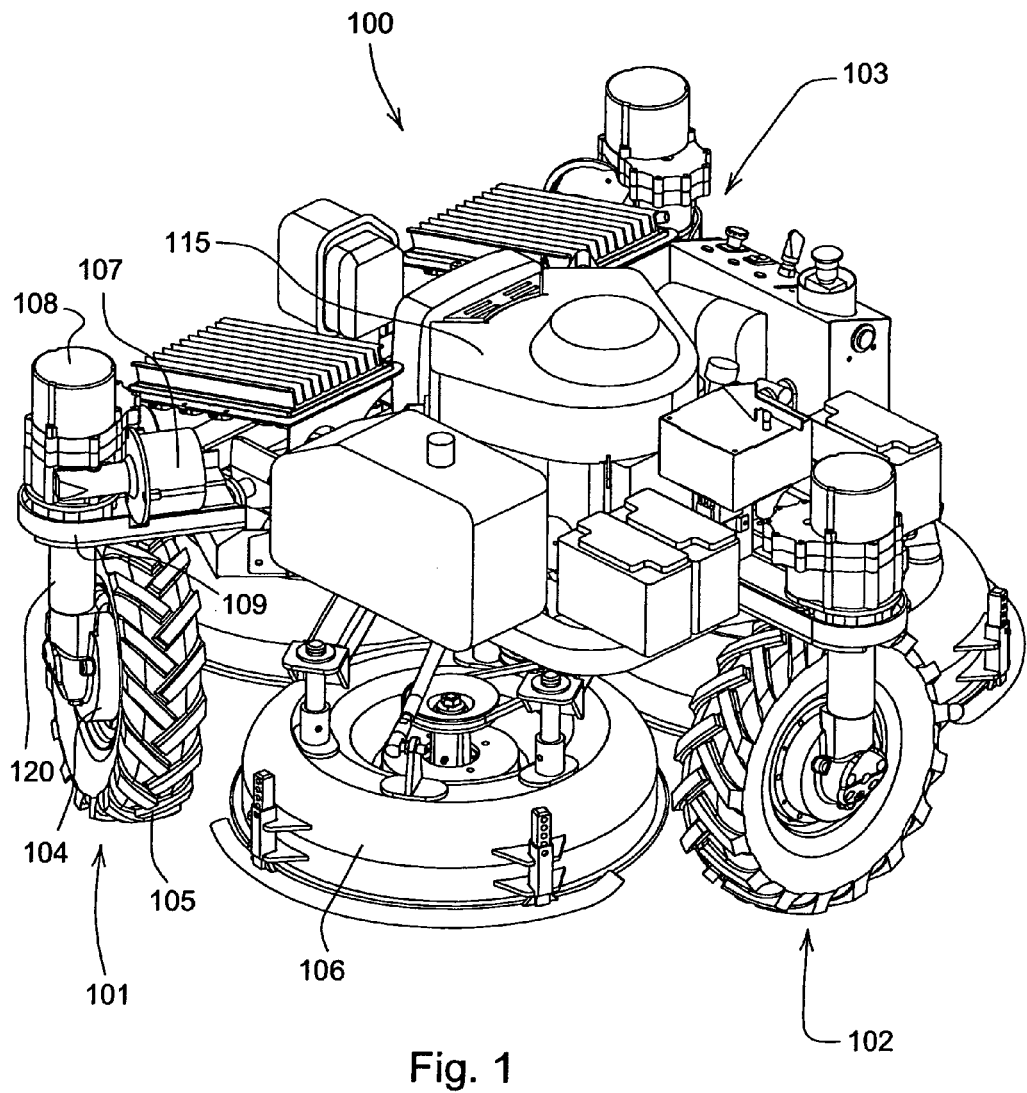
FIG. 1 is a perspective view of a self-propelled mower having a steering mechanism according to one embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

In one embodiment of the invention shown in FIG. 1, self-propelled mower 100 may include a plurality of traction wheels 101-03, a propulsion unit or engine 115, and at least one cutting deck 106 housing a blade for mowing grass. A tire 105 may be mounted on each wheel. The mower frame may be generally triangular and each wheel assembly may be positioned at or near the apex of sides of the triangle formed by the frame, although other shapes of the frame are possible and fall within the scope of the invention. Each wheel assembly may be positioned approximately equidistant on a radius about a center point of the mower, as viewed from the top. A controller may control a steering motor and drive motor for each wheel. The controller may be operated with an operator input device or a mission control computer. Examples of control systems for operating self-propelled vehicles are shown in U.S. Pat. Nos. 7,024,842 and 7,024,843. In the embodiment of FIG. 1, the self-propelled vehicle is riderless, but the invention also may be used on a self-propelled vehicle that carries an operator station for an operator.

Figure 2:
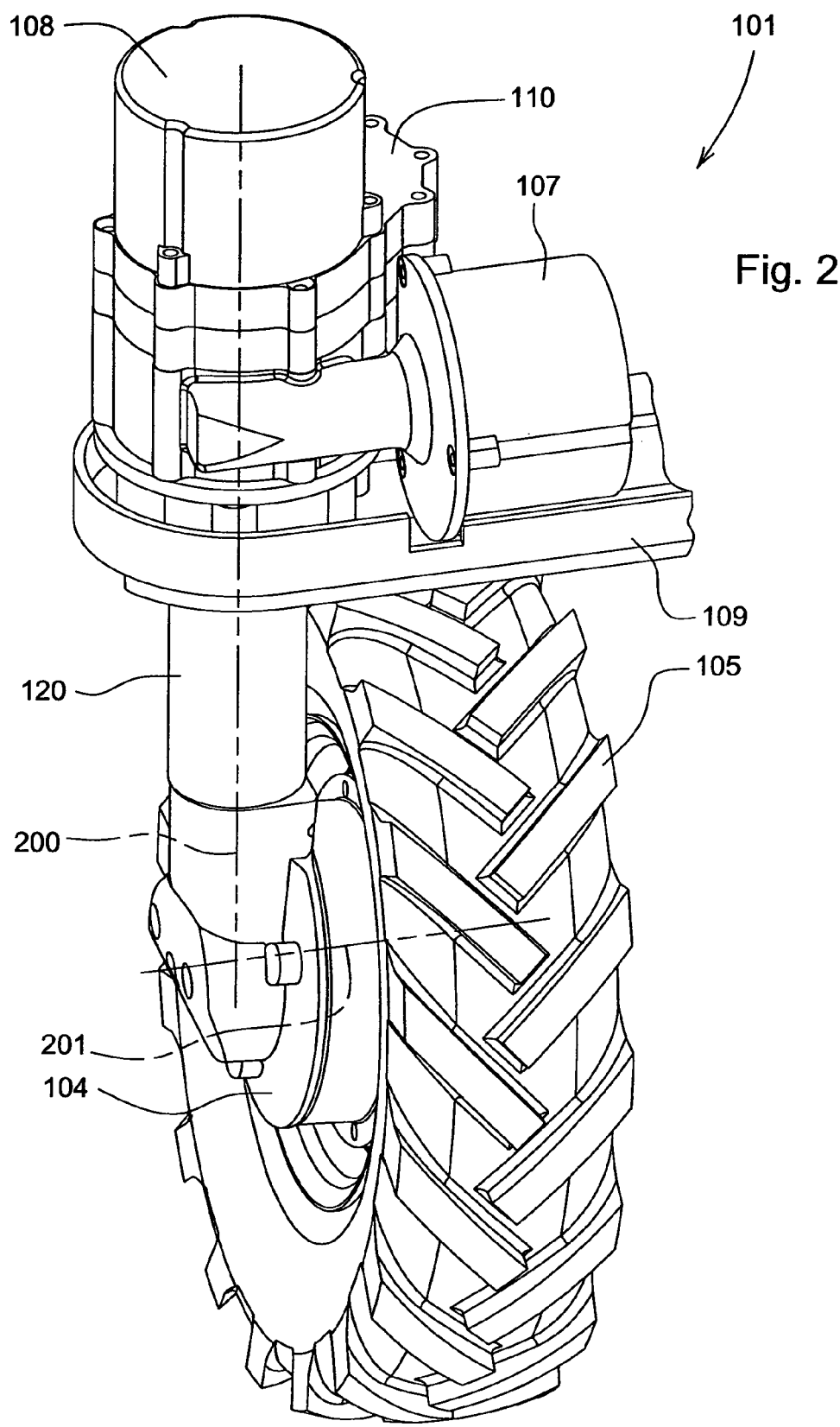
FIG. 2 is a side perspective view of a wheel assembly having a steering mechanism according to one embodiment of the invention.

In one embodiment shown in FIG. 2, each wheel assembly may include a steering mechanism having a steering motor 107 and a propulsion drive motor 108. Preferably, the steering motor and propulsion drive motor are both electric motors. Additionally, the steering motor and propulsion drive motor both may be positioned above wheel hub 104, and most preferably positioned above the outer diameter of tire 105. In one embodiment, gearbox 110 may provide suitable gear reduction between the drive motor and a propulsion drive shaft rotatably mounted within generally vertical support tube 120. Bracket 109 may mount the wheel assembly to the frame of the self-propelled mower.

Figure 3:
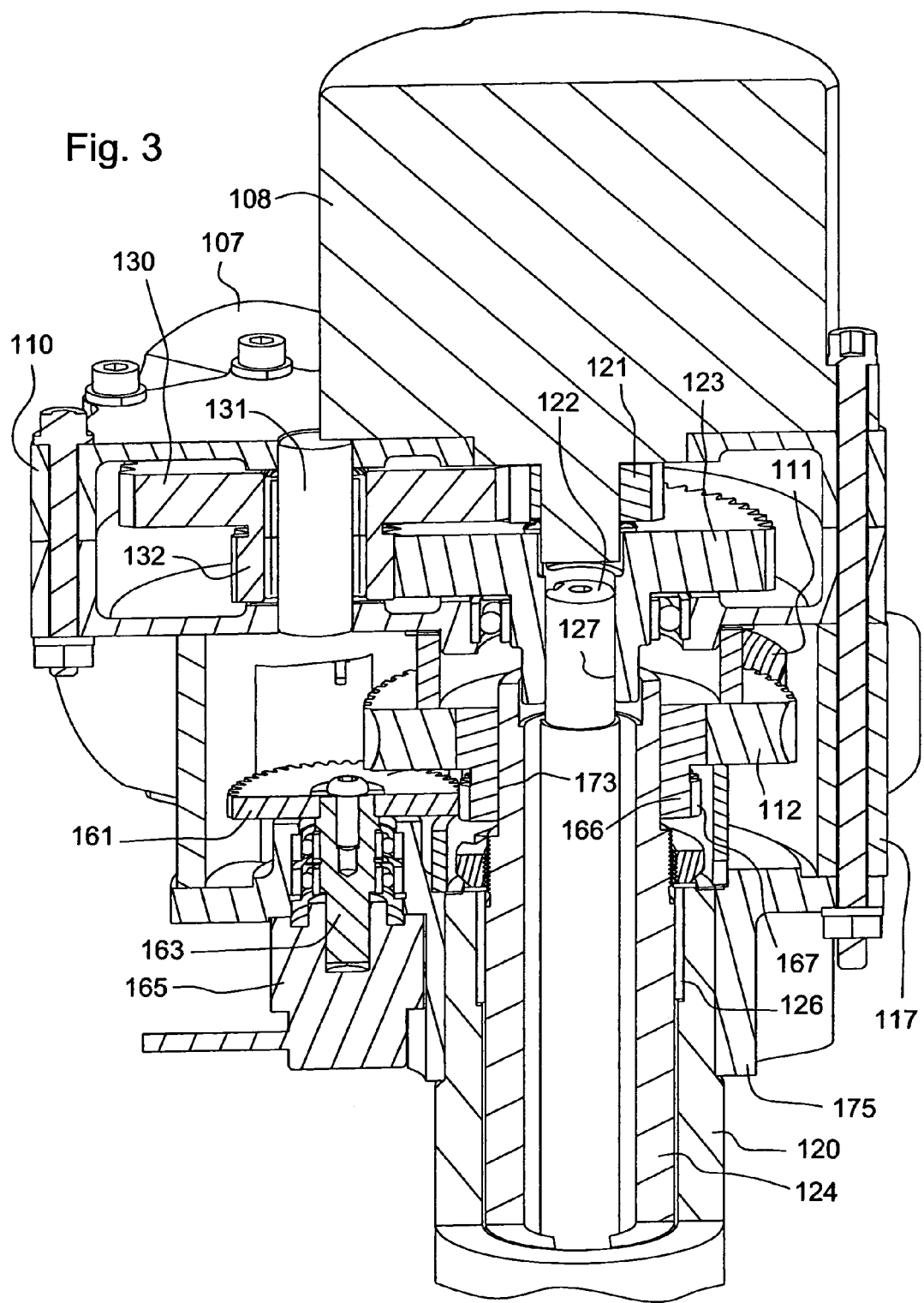
FIG. 3 is a cross section view of the upper portion of a steering mechanism according to one embodiment of the invention.

FIG. 3 is a cross section view of gearbox 110 and housing 117 at the upper end of wheel assembly 101 according to one embodiment of the invention. Propulsion drive motor 108 turns pinion 121 which engages cluster gear 130 on shaft 131. Pinion 132 also may be mounted on shaft 131 and engages propulsion drive gear 123. Propulsion drive shaft 122 may be attached to or mounted inside bore 127 extending from propulsion drive gear 123 through steering tube 124.

In one embodiment, steering motor 107 turns worm gear 111. Worm gear 111 engages steering worm wheel 112. Steering worm wheel 112 may be mounted on steering hub 166, which includes bore 173 into which steering tube 124 is mounted. Bearings 126, 128 may be provided between steering tube 124 and support tube 120.

In one embodiment, information concerning the steering position of wheel 101 may be provided to a controller. For example, steering hub gear 167 may be mounted on steering hub 166, and may engage encoder drive gear 161. Encoder drive gear may be mounted on encoder shaft 163 which provides actual steering position to steering position encoder 165 which may be electrically connected to a controller.

Figure 4:
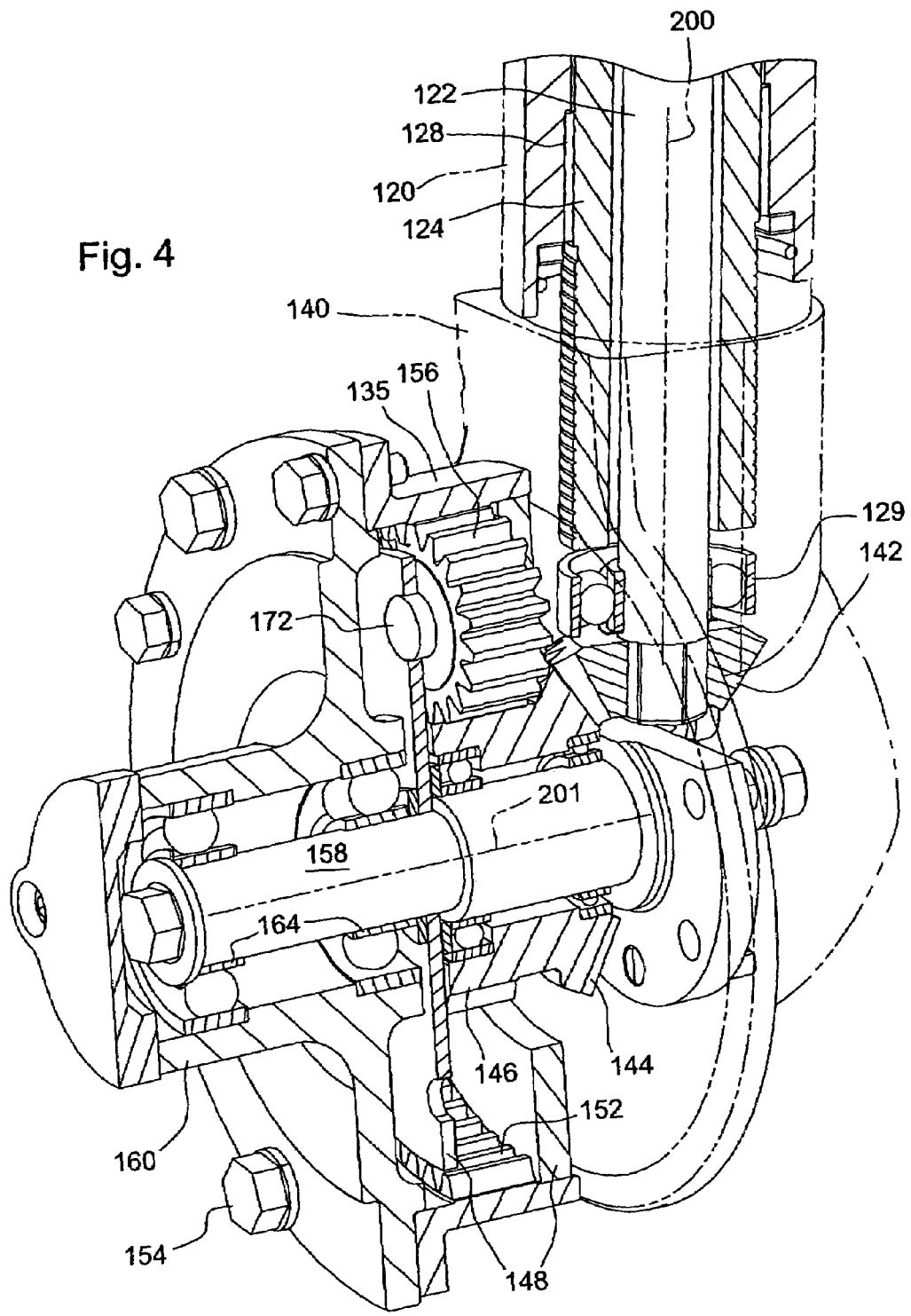
FIG. 4 is a cross section view of the lower portion of a steering mechanism according to one embodiment of the invention.

FIG. 4 provides a cross section view of a lower end of wheel assembly 101 according to one embodiment of the invention. At the lower end of the wheel assembly, bearing 129 may be provided between propulsion drive shaft 122 and housing 140. Bevel pinion 142 may be mounted on the lower end of the propulsion drive shaft. Bevel pinion 142 may engage bevel gear 144 mounted on spindle 158. Sun gear 146 may be integral with bevel gear 144, and may engage three planet gears 156 rotatably mounted on planet gear shafts 172. Planet gears 156 may engage ring gear 152 which is integral to the interior of ring 135. Rotation of propulsion drive shaft 122 turns sun gear 146, engaging planet gears 156 which turn ring gear 152. Ring 135 may be mounted to hub 160, and a wheel may be attached to the hub with bolts 154. Wheel bearings 164 may be provided between spindle 158 and hub 160.

In one embodiment, steering tube 124 may be threaded to housing 140. Planet gears 156 are mounted in planet carrier 148. If steering tube 124 is turned, housing 140 rotates on the same generally vertical axis. If steering tube 124 is turned while propulsion drive shaft 122 is held stationary, the wheel may roll around the steer axis. As the wheel rolls around the steer axis, the ring gear, planet gears, sun gear, and bevel ring gear turn. The bevel ring gear may walk around the bevel pinion which remains stationary with the drive shaft.

Figure 5:
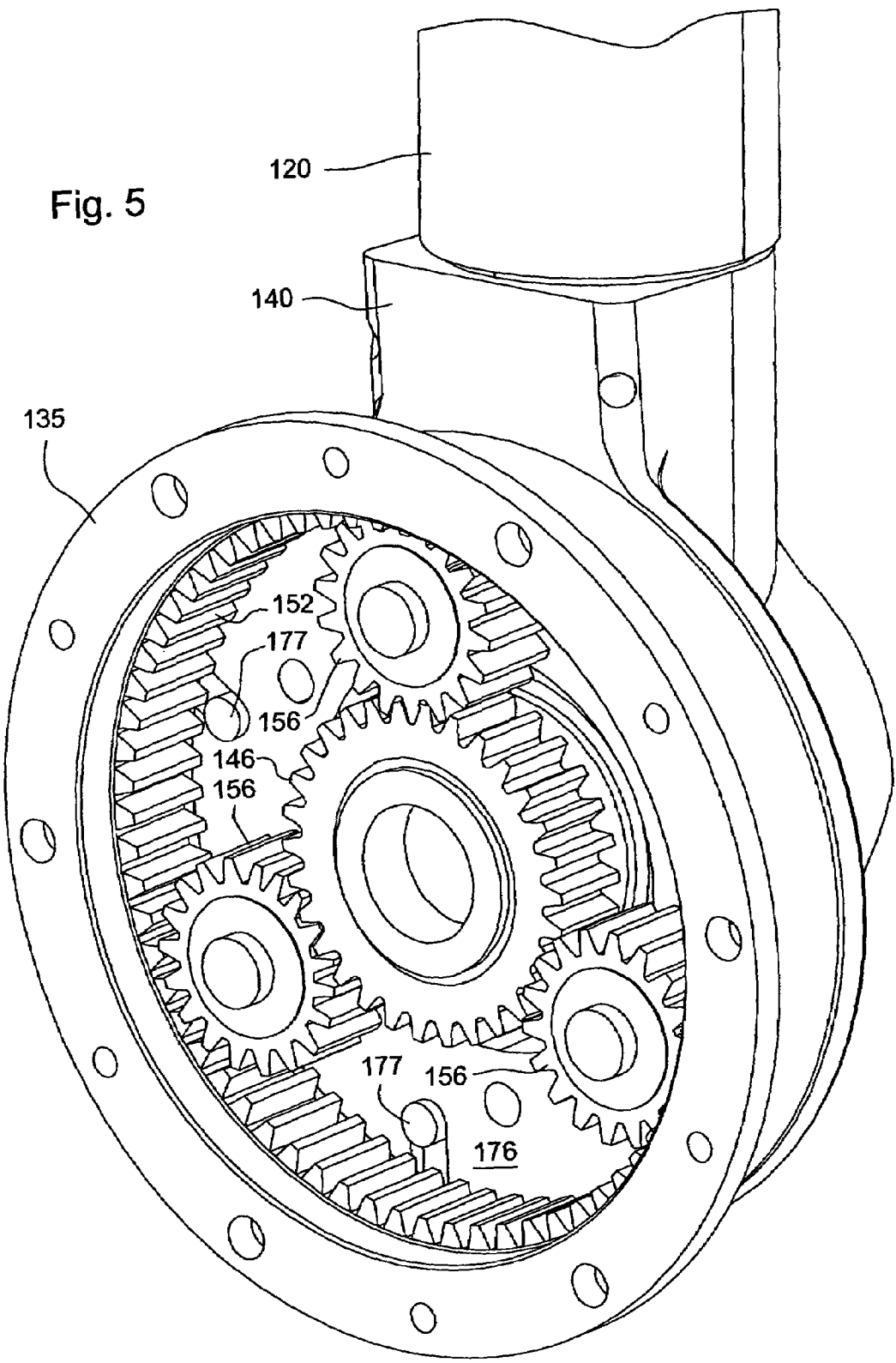
FIG. 5 is a side view of the gears in the lower portion of the steering mechanism of FIG. 4.

In one embodiment, planet carrier 148 may be held stationary with respect to housing 140 at the lower end of the wheel assembly. Locking members 177 shown in FIG. 5 may extend through notches in the outer periphery of planet carrier so that the planet carrier cannot rotate. Each wheel may be allowed to rotate freely, however, by removing or retracting the locking members sufficiently so that planet carrier 148 can turn.

In one embodiment, the gear ratio between the vertical drive shaft and axle is numerically equal to or approximately numerically equal (i.e., within about 10%) to the ratio of the rolling radius to the desired scrub radius of each wheel assembly. For example, in one embodiment, the measured rolling radius of tire 105 is 206.25 mm, and the desired scrub radius (measured from the axis of rotation to the wheel) is 60 mm, so the ratio of the rolling radius to desired scrub radius is (206.25 mm/60 mm)=3.4375.

In one embodiment, the gear reduction between the vertical drive shaft and axle may provide a gear ratio that is numerically equal to or approximately numerically equal to the ratio of rolling radius of tire 105 to a desired scrub radius. Additionally, the gear ratio may be configured to provide adequate clearance between the sidewall of tire 105 and steering support tube 120. For example, gears between the vertical drive shaft and axle may be configured as follows:

Bevel pinion 142: 21 teeth
Bevel gear 144: 34 teeth
Sun gear 146: 30 teeth
Ring gear 152: 66 teeth Based on the gears listed above, the numerical gear ratio between the vertical drive shaft and axle=(34/21)(66/30)=3.5619. In this example, the numerical gear ratio of 3.5619 is within 10% of the ratio of rolling radius to desired scrub radius of 3.4375.

Figure 6:
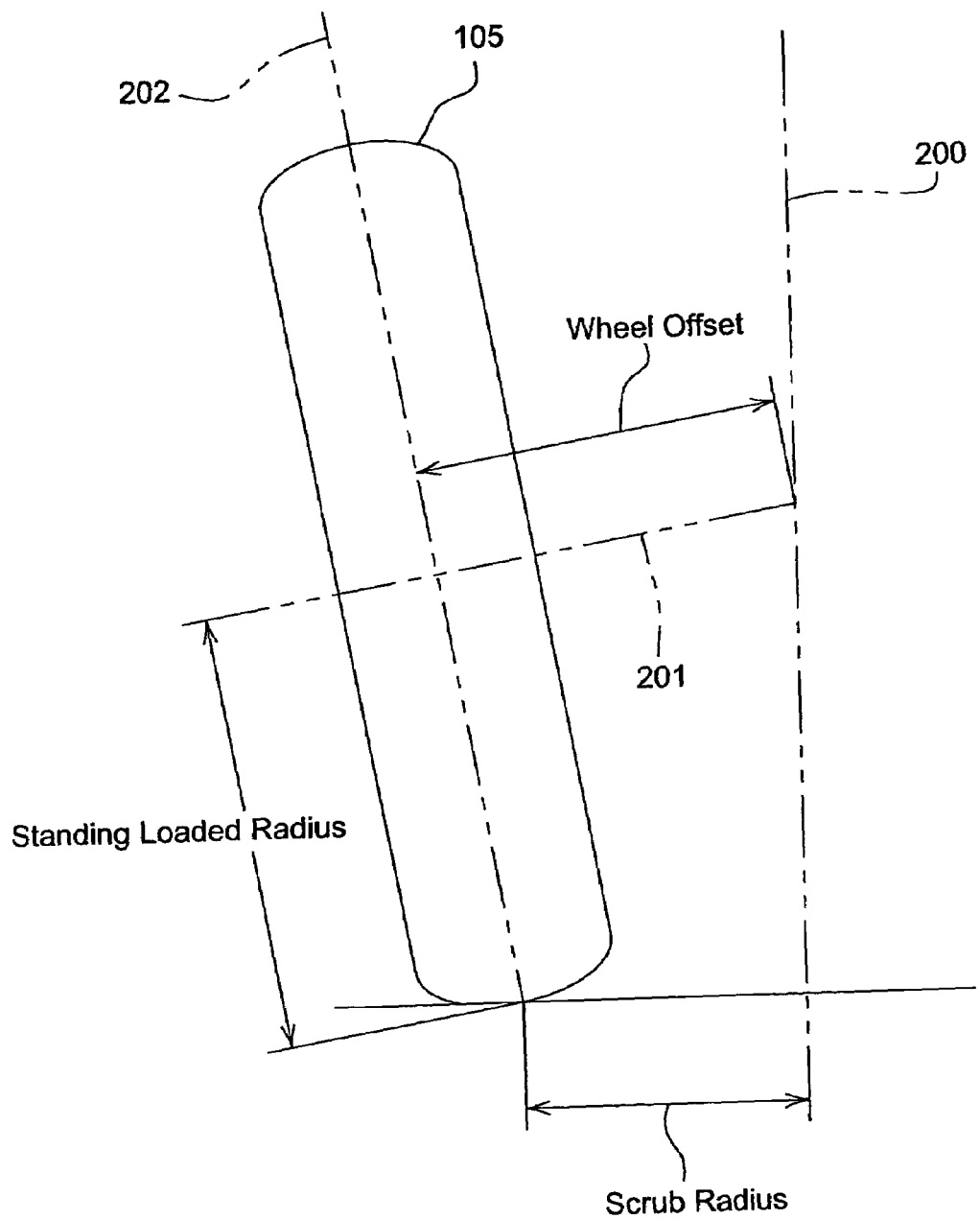
FIG. 6 is a schematic drawing showing the wheel offset of the steering mechanism based on the steer axis and spindle axis according to one embodiment of the invention.

FIG. 6 provides a schematic representation of the wheel offset which may be based on the relationship between steer axis 200 and spindle axis 201. In one embodiment, the wheel offset (measured from the center plane 202 of the wheel to the intersection of the spindle axis and steer axis, parallel to the spindle axis)=76 mm. The scrub radius and standing loaded radius also are shown.

Thus, in one embodiment, a steering mechanism is provided for each wheel on a self-propelled vehicle in which the gear ratio is equal to or approximately equal to the ratio of the rolling radius to scrub radius. This causes the pull generated by the wheel to apply a counterclockwise torque to the steering joint when the drive shaft rotates in a clockwise direction. This allows the wheel to roll around the steer axis when the unit is steered while the drive shaft is held stationary. Additionally, this synchronization limits the torque which must be resisted by the steering mechanism to the product of the rolling resistance and the scrub radius.

Optionally, in one embodiment, the wheel may be cambered to reduce some of the clearances for the steering components.

The steering mechanism of the present invention provides a number of advantages to simplify operation and improve cost effectiveness of self-propelled vehicles. For example, with the present invention, each wheel on a self-propelled vehicle may be turned while the steering support tube remains stationary. With the present invention, a mechanical drive carries power across the steering joint of a wheel on the self-propelled vehicle, instead of slip rings used with electric or hydraulic drives. The present invention also provides a steering mechanism that can reduce or eliminate scuffing, promoting operation of self-propelled vehicles over fragile surfaces such as golf courses without limiting maneuverability. Further, the present invention eliminates steering induced movement of a self-propelled vehicle, and simplifies maneuverability of such a vehicle in confined areas.

Figure 7:
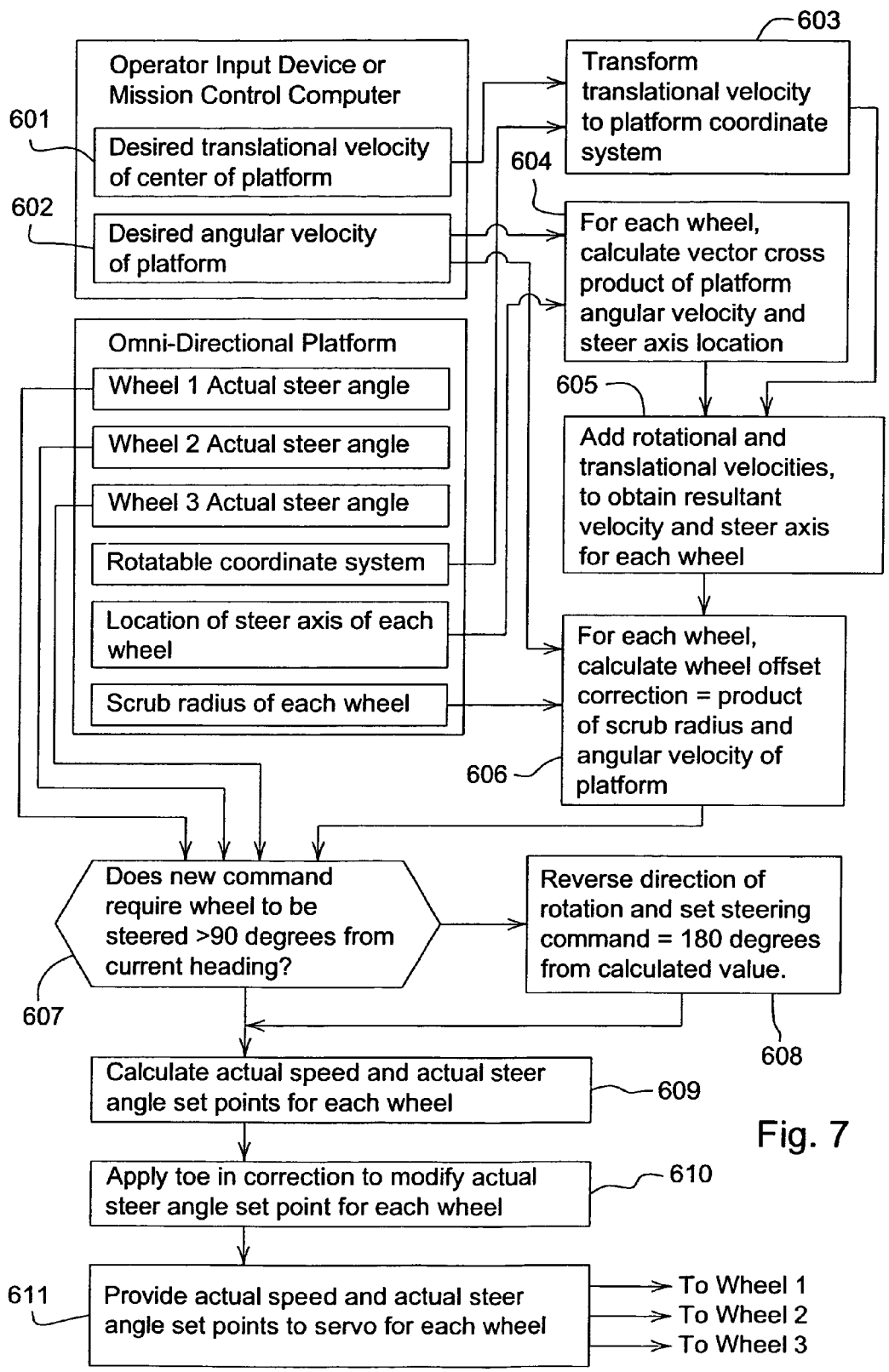
FIG. 7 is a block diagram of the steering logic for a self-propelled mower according to one embodiment of the invention.

FIG. 7 is a block diagram of steering logic for the wheels on a self-propelled mower according to one embodiment of the invention. The steering logic may reside in a controller on the vehicle platform of a self-propelled mower, and inputs may be provided through a user interface such as an operator input device, or a mission control computer, either of which may be on board the vehicle platform or separated from the vehicle platform. For example, a user interface and/or mission planner may be provided in a separate base station. The user interface may support a user's entry, selection or input of input data for the mission planner or otherwise. Path plan data or other input data may be communicated from the operator input device or mission control computer to a controller on board the vehicle platform. Alternatively, a user interface may support tele-operation or remote control of the mower by an individual. Accordingly, a user interface may be equipped with controls, buttons, switches or other electromechanical interfaces for steering, stopping, starting, controlling, and safeguarding the mower. The controller and user interface may communicate with each other via a wireless communications device, a wireless modem or both. The wireless communications device may comprise a transceiver that modulates an electromagnetic signal with an analog or digital modulation (e.g., phase-shift keying, code division multiple access, time division multiple access, spread spectrum frequency hopping spread spectrum or otherwise).

In an embodiment of the invention shown in FIG. 7, the steering logic may use certain status information concerning the vehicle platform. Status information may include the orientation of each wheel relative to the chassis of the vehicle platform, and the orientation of a rotatable coordinate system relative to the vehicle platform. Additionally, the control logic may store certain information concerning the vehicle platform including the location of the steer axis of each wheel, and the scrub radius of the wheel.

Still referring to FIG. 7, in one embodiment of the invention, the steering logic program receives three command values from an operator input device or mission control computer: the lateral and longitudinal components of a vector representing the desired velocity of the center of the vehicle platform relative to an input coordinate system rotatably attached to the platform at its center, and the angular velocity to be maintained about a vertical axis of the platform coordinate system. The logic block also has access to the present heading, relative to the chassis, of each wheel and the angular orientation of the input coordinate system relative to the vehicle platform chassis.

Specifically, according to one embodiment of the invention, in block 601, the desired linear velocity of the center of the vehicle platform is provided by an operator input device such as a joystick, or a mission control computer. In block 602, the desired angular velocity of the vehicle platform is provided by the operator input device or mission control computer. In block 603, the lateral component and longitudinal component of the desired linear velocity input vector are transformed into the platform coordinate system through the angle prescribing the current position of the input coordinate system.

In one embodiment, the location of the steer axis of each wheel may be stored in the logic program. The following calculations may be performed for each wheel. In block 604, for each wheel, the vector cross product of the platform angular velocity and the steer axis location, in vehicle coordinates, is calculated to provide the component of that wheel's velocity due to the platform's rotation. In block 605, for each wheel, the rotational component obtained in block 604 is added to the translational component obtained in block 603 to obtain the resultant velocity of the steer axis. The azimuth of the steer axis velocity vector determines the base steer angle set point for each wheel, while the magnitude of the steer axis velocity determines the base speed set point for that wheel's propulsion drive.

In one embodiment, in block 606, a wheel offset correction may be calculated for each wheel. The wheel offset correction may be based in part on the scrub radius, which may be unique for each wheel or identical for all of the wheels on the vehicle platform. The axle of the wheel may be oriented 90 degrees behind of the azimuth reference for the steering servo. The chassis coordinate system may be assumed to be right handed, with its vertical axis positive upward. Thus, angles may be positive counterclockwise in a top view, and the center plane of the wheel always may be to the right of the steer axis when facing in the direction of travel. Accordingly, the wheel offset correction may be calculated as the algebraic product of the scrub radius and the desired input angular velocity. A counterclockwise rotation of the vehicle platform causes the wheel offset correction to be positive, resulting in the actual wheel speed being greater than the wheel's base speed.

In one embodiment of the invention, in block 607, it is determined if a new command from the input device or mission control computer requires a wheel to be steered more than 90 degrees from its current position. If yes, in block 608, the logic reverses the direction of rotation of the wheel and sets the steering command to a value 180 degrees from the calculated value. This places the plane of the wheel to the left of the actual direction of travel, so the actual speed will be lower than base speed when the angular rotation is positive. If no, proceed to block 609.

In block 609, according to one embodiment of the invention, the actual speed set point for each wheel may be calculated as follows. When the actual steer angle set point equals the base steer angle set point, the actual speed set point is algebraically equal to the base speed set point plus the correction. If the actual steer angle set point is 180 degrees from the base steer angle set point, the actual speed set point may be algebraically equal to the negative of the base speed set point plus the correction.

In block 610, in one embodiment, the actual steer angle set point may then be modified by applying a toe in correction as follows. If the actual speed set point is positive, the toe in correction is added to the actual steer angle set point. If the actual speed set point is negative, the toe in correction is subtracted from the actual steer angle set point.

In block 611, the actual steer angle and actual speed set points may be provided to servos for each wheel of the vehicle platform. The control logic makes it possible to operate a self-propelled mower equipped with three or more driven and steered wheels in a manner that prevents scuffing and damage to the surface on which the vehicle is operating, while allowing full control of the vehicle platform's motion. The coordination of skid steering and Ackerman steering maximizes tractive performance, allowing operation on steeper slopes and/or providing more drawbar pull on level surfaces.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. Steering logic for a self-propelled vehicle having a plurality of wheels, each wheel having a steer axis and scrub radius, comprising the steps of:

inputting commands for a desired translation velocity and a desired angular velocity of the center of the vehicle;

for each wheel, calculating a rotational velocity as the vector cross product of the desired angular velocity and the steer axis for the wheel;

for each wheel, adding the rotational velocity and the translational velocity to obtain a resultant velocity and steer axis for the wheel;

for each wheel, calculating the wheel offset correction as the product of the scrub radius and the desired angular velocity of the vehicle; and calculating and providing the actual speed and actual steer angle set points to each wheel.

2. The steering logic of claim 1 further comprising the step of obtaining a current heading for each wheel, determining if the input commands require each wheel to be steered more than 90 degrees from the wheel's current heading, and if so, reversing the direction of rotation and setting the steering command at 180 degrees from the calculated actual steer angle.

3. The steering logic of claim 1 further comprising the step of applying a toe in correction to modify the actual steer angle set point for each wheel.

4. The steering logic of claim 1 wherein the step of inputting commands is done with an operator input device.

5. The steering logic of claim 1 wherein the step of inputting commands is done with a mission control computer.

6. The steering logic of claim 1 wherein the self-propelled vehicle is riderless.

7. The steering logic of claim 1 wherein the self-propelled vehicle has a rotatable coordinate system, and further comprising the step of transforming the desired translational velocity from the rotatable coordinate system.

* * * * *